(12) United States Patent
Kim et al.

(10) Patent No.: US 11,539,044 B2
(45) Date of Patent: Dec. 27, 2022

(54) SECONDARY BATTERY ELECTRODE, MANUFACTURING METHOD FOR THE SAME, AND ELECTRODE ASSEMBLY

(71) Applicant: LG CHEM, LTD., Seoul (KR)

(72) Inventors: Nam Won Kim, Daejeon (KR); Pil Kyu Park, Daejeon (KR); Han Gab Song, Daejeon (KR); Duck Joong Yun, Daejeon (KR); Dea Hyun Kim, Daejeon (KR); An Soo Jeong, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 50 days.

(21) Appl. No.: 16/605,491

(22) PCT Filed: Aug. 20, 2018

(86) PCT No.: PCT/KR2018/009533
§ 371 (c)(1),
(2) Date: Oct. 15, 2019

(87) PCT Pub. No.: WO2019/039815
PCT Pub. Date: Feb. 28, 2019

(65) Prior Publication Data
US 2021/0126249 A1 Apr. 29, 2021

(30) Foreign Application Priority Data

Aug. 21, 2017 (KR) .................. 10-2017-0105613
Aug. 9, 2018 (KR) .................. 10-2018-0093108

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/139* (2013.01); *H01M 10/0587* (2013.01); *H01M 2004/021* (2013.01)

(58) Field of Classification Search
CPC .... H01M 4/366; H01M 4/0404; H01M 4/139; H01M 10/0587
See application file for complete search history.

(56) References Cited

U.S. PATENT DOCUMENTS

| 8,202,642 B2 | 6/2012 | Sumihara et al. |
| 2005/0031961 A1* | 2/2005 | Tsunekawa ............. H01M 4/13 29/623.5 |

(Continued)

FOREIGN PATENT DOCUMENTS

| CN | 105474454 A | 4/2016 |
| JP | H11-265707 A | 9/1999 |

(Continued)

OTHER PUBLICATIONS

Extended European Search Report issued in related European Patent Application No. 18849036.1 dated Jan. 3, 2020.

(Continued)

*Primary Examiner* — Matthew T Martin
*Assistant Examiner* — Bartholomew A Hornsby
(74) *Attorney, Agent, or Firm* — Morgan, Lewis & Bockius LLP (57) ABSTRACT

The present disclosure relates to a secondary battery electrode, a manufacturing method for the same, and an electrode assembly, and more particularly, to a secondary battery electrode, a manufacturing method for the same, and an electrode assembly having improved stability.

In accordance with an exemplary embodiment, a secondary battery electrode includes a current collector that extends in one direction, a first active material layer provided on one (Continued)

surface of the current collector and including a first inclined portion and a first protruding portion, and a second active material layer provided on the other surface of the current collector and including a second inclined portion and a second protruding portion. In particular, a position of the second protruding portion is controlled on the second active material layer to be disposed at a position that is not directly opposite to the first inclined portion with respect to the current collector.

13 Claims, 8 Drawing Sheets

(51) Int. Cl.
*H01M 4/139* (2010.01)
*H01M 10/0587* (2010.01)
*H01M 4/02* (2006.01)

(56) References Cited

U.S. PATENT DOCUMENTS

| | | | |
|---|---|---|---|
| 2015/0244017 A1 | 8/2015 | Nishinaka et al. | |
| 2016/0126598 A1 | 5/2016 | Lee et al. | |
| 2017/0179461 A1 | 6/2017 | Moon et al. | |
| 2018/0050365 A1* | 2/2018 | Son | B05C 5/0254 |

FOREIGN PATENT DOCUMENTS

| | | |
|---|---|---|
| JP | 2001-015103 A | 1/2001 |
| JP | 2011-138675 A | 7/2011 |
| JP | 2011-146219 A | 7/2011 |
| JP | 2012-009376 A | 1/2012 |
| JP | 2014-120293 A | 6/2014 |
| JP | 2016-115416 A | 6/2016 |
| KR | 2006-0010660 A | 2/2006 |
| KR | 10-0624936 B1 | 9/2006 |
| KR | 10-2011-0054024 A | 5/2011 |
| KR | 10-2015-0054702 A | 5/2015 |
| KR | 10-2015-0128063 A | 11/2015 |
| KR | 2016-0051109 A | 5/2016 |
| KR | 10-2017-0013667 A | 2/2017 |
| KR | 10-2017-0074584 A | 6/2017 |

OTHER PUBLICATIONS

International Search Report issued in corresponding International Patent Application No. PCT/KR2018/009533, dated Mar. 8, 2019.
Office Action issued in corresponding Indian Patent Application No. 201917041197 dated Aug. 25, 2021.

* cited by examiner

SECONDARY BATTERY ELECTRODE, MANUFACTURING METHOD FOR THE SAME, AND ELECTRODE ASSEMBLY

TECHNICAL FIELD

The present disclosure relates to a secondary battery electrode, a manufacturing method for the same, and an electrode assembly, and more particularly, to a secondary battery electrode, a manufacturing method for the same, and an electrode assembly to improve stability of the secondary battery.

BACKGROUND ART

In recent years, chargeable and dischargeable secondary batteries have been widely used as energy sources for wireless mobile devices. Further, secondary batteries have attracted considerable attention as a power source for an electric vehicle (EV), a hybrid electric vehicle (HEV), and a plug-in hybrid electric vehicle (Plug-In HEV), which have been proposed as solutions for air pollution or the like caused by existing gasoline and diesel vehicles using fossil fuels.

While one or several battery cells are used for each of small-sized mobile devices, a medium to large sized battery module, in which a plurality of battery cells are electrically connected, is used for medium to large sized devices due to necessity of high power and high capacity.

Since the medium to large sized battery module is desirably manufactured in size and weight as small as possible, a rectangular battery or a pouch-type battery, which may be stacked with a high degree of integration and a small weight with respect to capacity, is generally used for a battery cell (unit cell) of the medium to large sized battery module. In particular, since the pouch-type battery, which uses an aluminum laminate sheet or the like as an exterior member, has advantageous aspects such as a light weight, low manufacturing costs, and a flexible form factor, the pouch-type battery has drawn attention in recent years.

Various methods for manufacturing the above-described secondary batteries have been developed. The most generally used method among the various methods is a technique of winding a positive electrode, a negative electrode, and a separator disposed therebetween to form into a jellyroll shape. However, since the above-described jellyroll shaped electrode assembly has a cross-sectional structure of a circular or oval shape by winding an elongated sheet in which a positive electrode and a negative electrode are densely arranged, a stress generated by expansion and contraction of the electrode when charged or discharged is accumulated within the electrode assembly, and when such a stress accumulation exceeds a predetermined range, deformation such as a crack occurs in the electrode assembly. Due to the above-described deformation of the electrode assembly, performance of the battery is substantially reduced, and due to internal short-circuit, stability of the battery is threatened.

PRIOR ART DOCUMENTS

Korean Publication Patent No. 10-2015-0054702

DISCLOSURE OF THE INVENTION

Technical Problem

The present disclosure provides a secondary battery electrode, which may relieve a pressure applied to a current collector to prevent the current collector from deforming and also to prevent in advance a crack from occurring while the electrode is manufactured, a manufacturing method for the same, and an electrode assembly.

Technical Solution

In accordance with an exemplary embodiment, a secondary battery electrode includes a current collector that extends in one direction, a first active material layer provided on one surface of the current collector and including a first inclined portion and a first protruding portion, and a second active material layer provided on the other surface of the current collector and including a second inclined portion and a second protruding portion. In particular, a position of the second protruding portion is controlled on the second active material layer to be disposed at a position that is not directly opposite to the first inclined portion with respect to the current collector.

The second protruding portion may be spaced by a predetermined distance from the second inclined portion.

A non-coated portion, on which the first active material layer is not applied, may be provided on one surface of the current collector.

The first inclined portion and the first protruding portion may be provided on one side of the first active material layer, and the second inclined portion and the second protruding portion may be provided on one side of the second active material layer, which is disposed in the same direction as the one side of the first active material layer.

Each of the first active material layer and the second active material layer is made of an electrode active material for a negative electrode or an electrode active material for a positive electrode.

In accordance with another exemplary embodiment, a manufacturing method for a secondary battery electrode includes a process of preparing a current collector on which a first active material layer including a first inclined portion and a first protruding portion is formed on one surface thereof, a process of transferring the current collector in one direction, and a process of forming a second active material layer including a second inclined portion and a second protruding portion by applying a second active material on the other surface of the current collector. In particular, in the process of forming the second active material layer, a position of the second protruding portion is controlled on the second active material layer to be formed at a position that is not directly opposite to the first incline portion with respect to the current collector.

In the process of forming the second active material layer, the second protruding portion may be spaced by a predetermined distance from the second inclined portion.

A non-coated portion, on which the first active material layer is not applied, may be formed on one surface of the current collector.

The position of the second protruding portion may be controlled by regulating an application pressure of the second active material layer.

The position of the second protruding portion may be controlled by regulating a transfer speed of the current collector.

In accordance with yet another exemplary embodiment, an electrode assembly, which is manufactured by winding a positive electrode, a negative electrode, and a separator disposed therebetween, includes at least one of the positive electrode and the negative electrode including the secondary battery electrode according to the present disclosure.

Advantageous Effects

According to a secondary battery electrode, a manufacturing method for the same, and an electrode assembly in accordance with an exemplary embodiment, as a position of the protruding portion of the second active material layer is controlled to be formed at the position that is not directly opposite to the inclined portion of the first active material layer with respect to the current collector, the pressure applied to the current collector may be relieved to prevent the current collector from deforming, and the crack occurring while the electrode is manufactured may be prevented in advance.

Additionally, in accordance with the exemplary embodiment, the first active material layer and the second active material layer, which are formed on the both surfaces of the current collector, respectively, may be controlled in shape to produce a secondary battery electrode, which has a uniform thickness, and enhance the product stability, the economical feature, and the yield.

MODE FOR CARRYING OUT THE INVENTION

Hereinafter, exemplary embodiments of the present invention will be described in detail with reference to the accompanying drawings. The present invention may, however, be embodied in different forms and should not be construed as limited to the embodiments set forth herein. Rather, these embodiments are provided so that the present invention will be thorough and complete, and will fully convey the scope of the present invention to those skilled in the art. In the figures, like reference numerals refer to like elements throughout.

While one or several battery cells are used for each of small-sized mobile devices, a medium to large sized battery module, in which a plurality of battery cells are electrically connected, is used for medium to large sized devices due to a requirement for high power and high capacity.

Since the medium to large sized battery module is desirably manufactured in size and weight as small as possible, a rectangular battery or a pouch-type battery, which may be stacked with a high degree of integration and a small weight with respect to capacity, is generally used for a battery cell (unit cell) of the medium to large sized battery module. In particular, since the pouch-type battery, which uses an aluminum laminate sheet or the like as an exterior member, has advantageous aspects such as a light weight, low manufacturing costs, and a flexible form factor, the pouch-type battery has drawn attention in recent years.

Various methods for manufacturing the above-described secondary batteries have been provided. The most generally used method among the various methods is a technique of winding a positive electrode, a negative electrode, and a separator disposed therebetween to form into a jellyroll shape. In particular, electrodes such as a positive electrode and a negative electrode contained in an electrode assembly of a secondary battery undergo a process of forming an electrode active material layer on a current collector. The above-described process of forming the electrode active material layer includes a process of applying active material slurry in which electrode active material particles are sprayed in a binder solution, and a process of forming an electrode active material layer on a current collector by drying the active material slurry applied on the current collector to remove the solvent and moisture that exist in the active material slurry.

The active material slurry has a high viscosity coefficient due to physical characteristics thereof. Accordingly, when the electrode active material layer is formed on the current collector, an inclined portion, which is defined as a drag area, is acutely formed at an end of an application area, and a protruding portion, which is defined as a balcony area, is formed at a position spaced by a predetermined distance from the inclined portion in a protruding manner.

Figure 1:
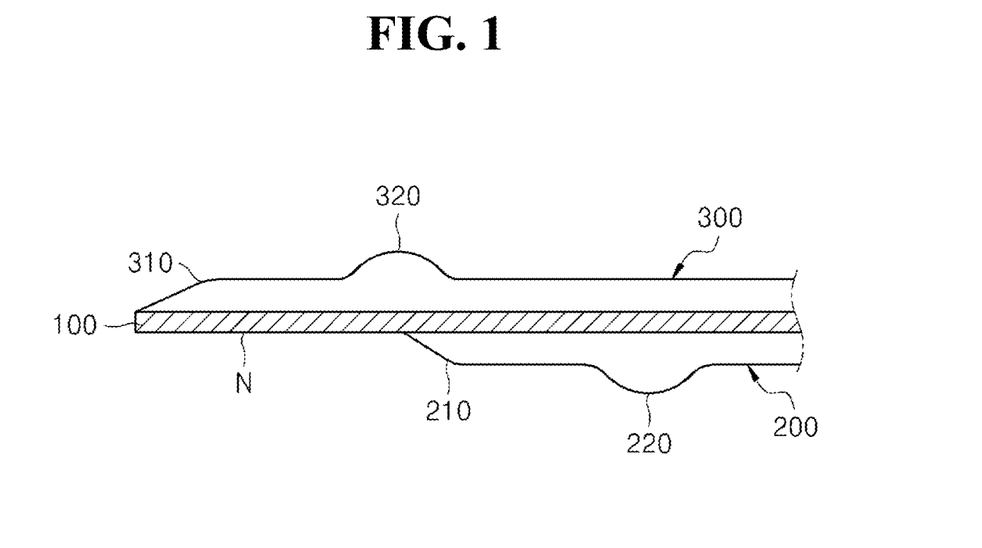
FIG. 1 is a view illustrating an appearance of a general electrode for a secondary battery.
Figure 2:
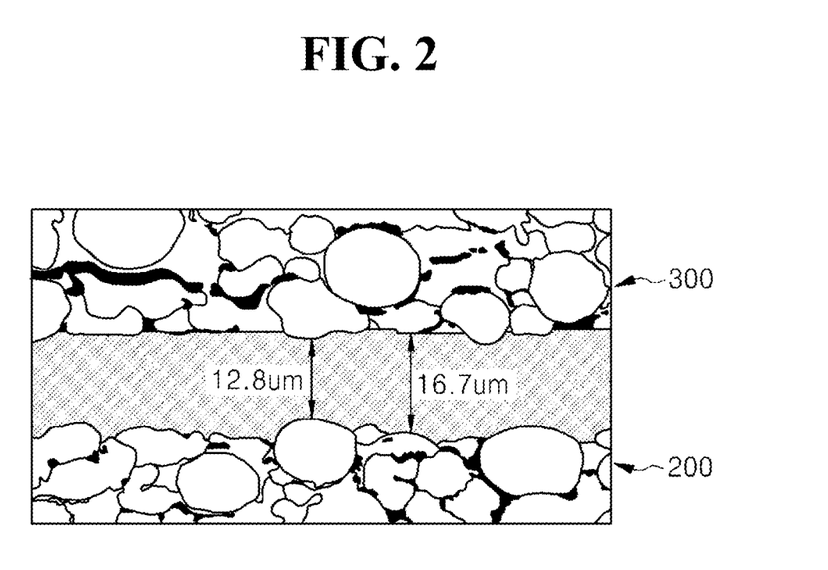
FIG. 2 is a view illustrating a state in which a pressure is applied to a current collector of the general electrode for a secondary battery.
Figure 3:
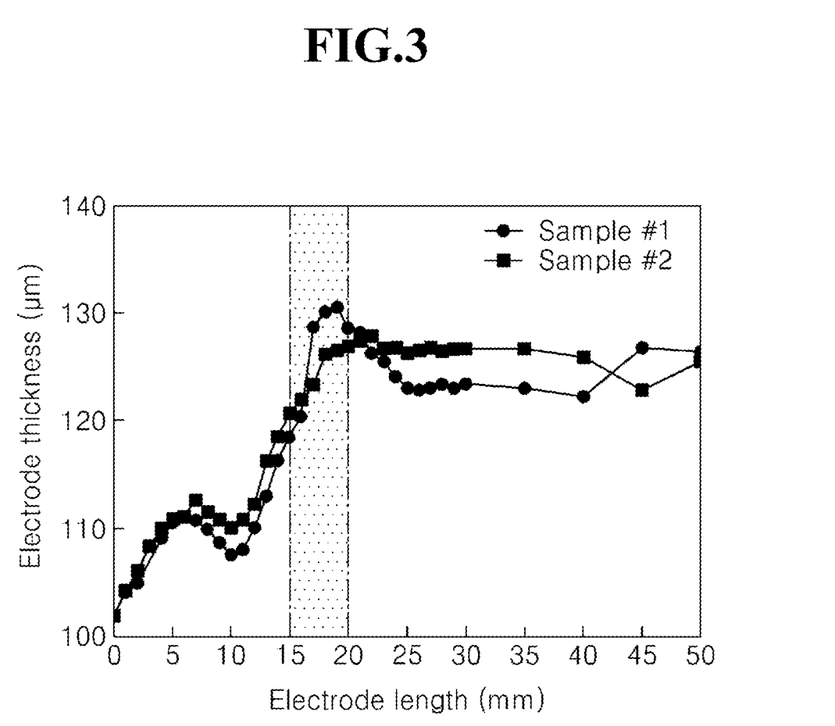
FIG. 3 is a view illustrating a position at which a crack occurs in the current collector of the general electrode for a secondary battery.
Figure 4:
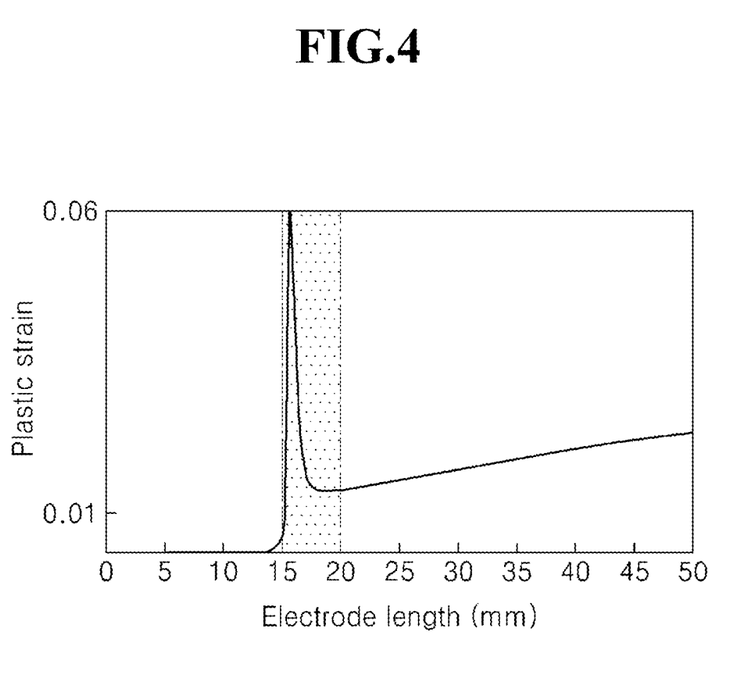
FIG. 4 is a view illustrating a plastic strain of the current collector of the general electrode for a secondary battery.

FIG. 1 is a view illustrating an appearance of a general electrode for a secondary battery, and FIG. 2 is a state in which a pressure is applied to a current collector of the general electrode for a secondary battery. Further, FIG. 3 is a view illustrating a position at which a crack occurs in the current collector of the general electrode for a secondary battery, and FIG. 4 is a view illustrating a plastic strain of the current collector of the general electrode for a secondary battery.

Referring to FIGS. 1 to 4, in a case of the general electrode for a secondary battery, a first active material layer 200 including a first inclined portion 210 and a first protruding portion 220 is provided on one surface of a current collector 100 that extends in one direction. A second active material layer 300 including a second inclined portion 310 and a second protruding portion 320 is provided on the other surface of the current collector 100. As described above, the inclined portion represents a drag area formed at an end of a coated area in an acute manner, and the protruding portion represents a balcony area formed at a position spaced by a predetermined distance from the inclined portion in a protruding manner.

In a battery having a jellyroll-type electrode assembly, a non-coated portion N, on which no first active material layer 200 is applied, is provided on one surface of the current collector 100 to ensure stability for winding. However, as described above, when the non-coated portion N, on which the first active material layer 200 is not applied, is provided on the one surface of the current collector 100, and the second active material layer 300 is provided on the other surface of the current collector 100, a second protruding portion 320 of the second active material layer 300 is disposed at an area directly opposite to the first inclined portion 210 of the first active material layer 200.

As described above, when the second protruding portion 320 of the second active material layer 300 is disposed at the area directly opposite to the first inclined portion 210 of the first active material layer 200, as a thickness of the electrode of an area on which the second protruding portion 320 of the second active material layer 300 becomes substantially thick, and a rolling ratio at the corresponding area increases locally, deformation occurs on the current collector 100. In other words, as illustrated in FIG. 2, although the current collector 100 maintains a thickness of approximately 16.7 μm between the first active material layer 200 and the second active material layer 300, the current collector 100 has a thickness of approximately 12.8 μm at the area, which is directly opposite to the first inclined portion 210 of the first active material layer 200 and on which the second protruding portion 320 of the second active material layer 300 is disposed.

In general, the non-coated portion N, on which the first active material layer 200 is not applied, is disposed by a predetermined length (a length of approximately 13 mm in FIGS. 2 to 4) from the end of the current collector 100 on the one surface of the current collector 100. In this case, as illustrated in FIG. 3, the thickness of the electrode including the first active material layer 200 and the current collector 100 continues to increase from a point at which the electrode length, i.e., a length from the end of the current collector, is approximately 0 mm, the non-coated portion is passed, and subsequently the first active material layer 200, which is initiated with the first inclined portion 210, is disposed at an area in which the second protruding portion 320 of the second active material layer 300 is disposed. Accordingly, the thickness of the electrode including the first active material layer 200, the current collector 100, and the second active material layer 300 rapidly increases at a point at which the electrode length including the non-coated portion N and a boundary of the second active material layer 300 is approximately 15 mm to approximately 20 mm.

Due to the above-described increase in electrode thickness, at the point that corresponds to approximately 15 mm to approximately 20 mm from the end of the current collector 100, i.e., in a predetermined area including the non-coated portion N and the boundary of the second active material layer 300, the rolling ratio locally increases. In other words, as illustrated in FIG. 4, an equivalent plastic stain (PEEQ) of the current collector 100 rapidly increases to have a peak value of approximately 0.06 or more at a position at which the length from the end of the current collector is approximately 15 mm to approximately 20 mm due to the local increase of the rolling ratio. As a result, deformation occurs in the current collector 100, and a crack, i.e., short-circuit, occurs during the winding.

Thus, the electrode for a second battery, the method for manufacturing the same, and the electrode assembly in accordance with an exemplary embodiment provide a technical feature capable of preventing the deformation of the current collector 100 by relieving the pressure applied to the current collector 100 and preventing the crack from occurring in advance while the electrode is wound in a process of manufacturing the electrode.

Figure 5:
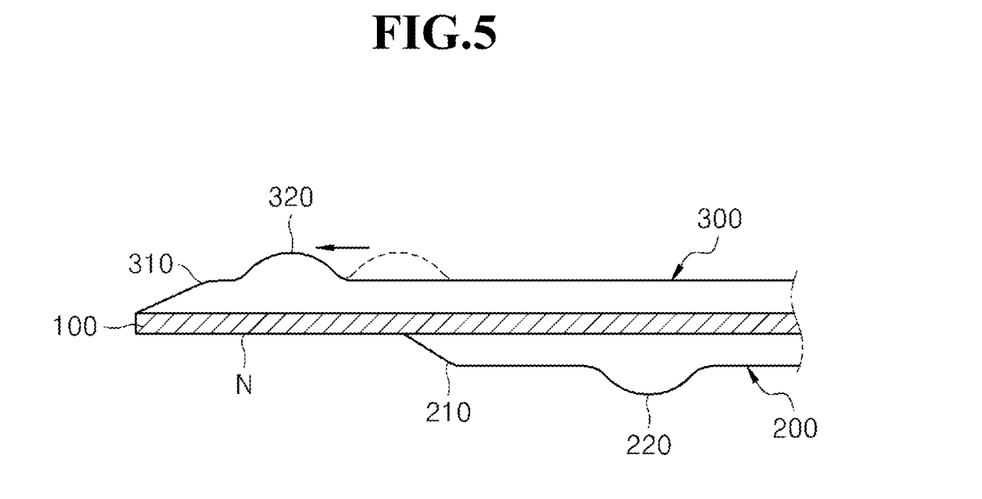
FIG. 5 is a view illustrating an appearance of a general electrode for a secondary battery in accordance with an exemplary embodiment.
Figure 6:
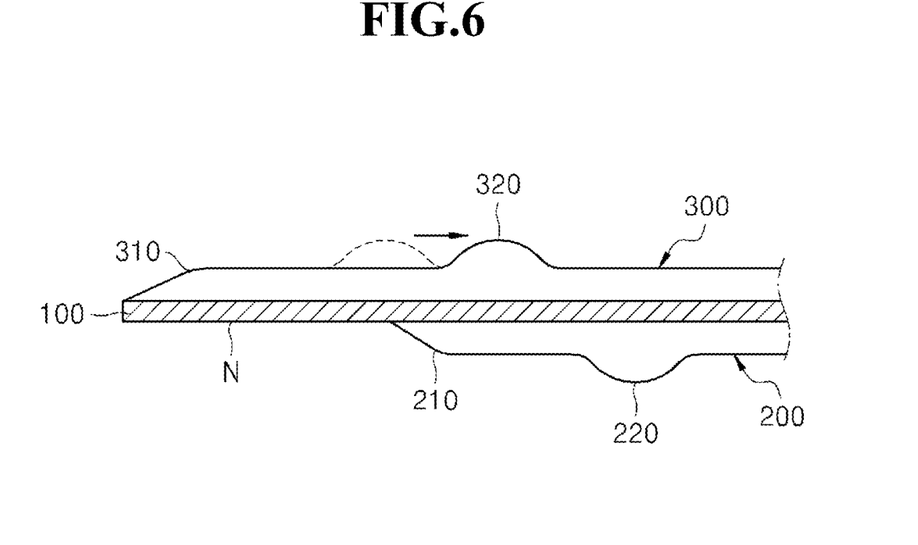
FIG. 6 is a view illustrating an appearance of a general electrode for a secondary battery in accordance with another exemplary embodiment.

FIG. 5 is a view illustrating an appearance of an electrode for a secondary battery in accordance with an exemplary embodiment, and FIG. 6 is a view illustrating an appearance of an electrode for a secondary battery in accordance with another exemplary embodiment.

Referring to FIGS. 5 and 6, an electrode for a secondary battery in accordance with an exemplary embodiment includes a current collector 100 that extends in one direction, a first active material layer 200 provided on one surface of the current collector 100 and including a first inclined portion 210 and a first protruding portion 220, and a second active material layer 300 provided on the other surface of the current collector 100 and including a second inclined portion 310 and a second protruding portion 320. In particular, the position of the second protruding portion 320 is controlled to be disposed at a position on the second active material layer 300, which is not directly opposite to the first inclined portion 210 with respect to the current collector 100.

The first inclined portion 210 and the first protruding portion 220 are provided on one side of the first active material layer 200, and the second inclined portion 310 and the second protruding portion 320 are provided on one side of the second active material layer 300, which is disposed in the same direction as the one side of the first active material layer 200. In other words, as exemplarily illustrated in FIGS. 5 and 6, the first inclined portion 210 and the first protruding portion 220 may be provided on the left side of the first active material layer 200, and the second inclined portion 310 and the second protruding portion 320 may be provided on the left side of the second active material layer 300, which is the same direction as the above.

As previously described, in the battery having a jellyroll-type electrode assembly, a non-coated portion N, on which the first active material layer 200 is not applied, is provided on one surface of the current collector 100 to ensure stability for winding. However, as described above, when the non-coated portion N, on which the first active material layer 200 is not applied, is provided on the one surface of the current collector 100, and the second active material layer 300 is provided on the other surface of the current collector 100, a protruding portion 320 of the second active material layer 300 is disposed at an area directly opposite to the first inclined portion 210 of the first active material layer 200. As a result, a rolling ratio locally increases, and a crack occurs. Accordingly, in the electrode for a secondary battery in accordance with an exemplary embodiment, the second protruding portion 320 of the second active material layer 300 is controlled to be disposed at a position on the second active material layer 300, which is not directly opposite to the first inclined portion 210 with respect to the current collector 100.

The non-coated portion N may be provided to have a length of approximately 10 mm to approximately 20 mm in an extension direction of the current collector 100. The first inclined portion 210 represents a drag area provided to have an acute shape at an end of the first active material layer 200, and the second inclined portion 310 represents a drag area provided to have an acute shape at an end of the second active material layer 300.

As described in an exemplary embodiment, when the second protruding portion 320 of the second active material layer 300 is disposed at a position that is not directly opposite to the first inclined portion 210 of the first active material layer 200 with respect to the current collector 100, the end of the first active material layer 200, i.e., the first inclined portion 210, is not rapidly varied in thickness. In other words, regarding a limitation in which the thickness of the electrode is rapidly varied by the first inclined portion 210 and the second protruding portion 320, as the second protruding portion 320 is disposed at a position that is not directly opposite to the first inclined portion 210, the electrode thickness on the area of the first inclined portion 210 may be varied solely by the first inclined portion 210, and thus the electrode thickness may be prevented from rapidly varying.

FIG. 5 is a view illustrating an appearance of the electrode for a secondary battery in accordance with an exemplary embodiment. As illustrated in FIG. 5, the second protruding portion 320 of the second active material layer 300 is displaced from the position directly opposite to the inclined portion 210 to an end side (left side on the drawing) of the current collector 100. Accordingly, as the electrode thickness in the area directly opposite to the first inclined portion 210 is prevented from rapidly varying, and as a result, the local rolling ratio may be prevented from rapidly increasing due to the first inclined portion 210 and the second protruding portion 320, the deformation and the crack may be prevented in advance from occurring on the current collector 100 while the electrode is wound.

FIG. 6 is a view illustrating an appearance of an electrode for a secondary battery in accordance with another exemplary embodiment. As illustrated in FIG. 6, the second protruding portion 320 of the second active material layer 300 is displaced from the position directly opposite to the first inclined portion 210 to an opposite side (right side on the drawing) of the end of the current collector 100. In other words, the second protruding portion 320 is spaced by a predetermined distance from the second inclined portion 310. Accordingly, as previously described in an exemplary embodiment, as the electrode thickness in the area directly opposite to the first inclined portion 210 is prevented from rapidly varying, and as a result, the local rolling ratio is prevented from rapidly increasing due to the first inclined portion 210 and the second protruding portion 320, the deformation and the crack may be prevented in advance from occurring on the current collector 100. A configuration in which the position of the second protruding portion 320 is displaced on the second active material layer, will be described below in detail in relation to the method for manufacturing the electrode for a secondary battery.

A method for manufacturing an electrode for a secondary battery in accordance with an exemplary embodiment includes a process of preparing the current collector 100 in which the first active material layer 200 including the first inclined portion 210 and the first protruding portion 220 is provided on one surface thereof, a process of transferring the current collector 100 in one direction, and a process of forming the second active material layer 300 including the second inclined portion 310 and the second protruding portion 320 by applying the second active material on the other surface of the current collector 100. In the process of forming the second active material layer 300, the position of the second active material layer 300 is controlled to allow the second protruding portion 320 to be disposed at a position that is not directly opposite to the first inclined portion 210 with respect to the current collector 100.

A coating device for forming the active material layer includes a supply roll for unwinding the current collector 100, which is wound in a roll type, to continuously supply the unwound current collector in one direction; a coating die for applying active material slurry, which is supplied from an external active material slurry supply source, to the current collector 100, which continuously moves in the one direction; a dryer for forming the active material layer on the current collector 100 by drying the active material slurry applied on the current collector 100; and a retracting roll for retracting the current collector 100 in a rolled state by winding the current collector 100 on which the active material is provided.

Firstly, the process of preparing the current collector 100, in which the first active material layer 200 including the first inclined portion 210 and the first protruding portion 220 is formed on one surface thereof, is performed by the above-described coating device. In the process of preparing the current collector 100, the active material slurry is applied on one surface of the current collector 100 and subsequently dried to form the first active material layer 200. In particular, the first active material layer 200 is formed at a position spaced by a distance of approximately 10 mm to approximately 20 mm from the end of the current collector 100, to allow the non-coated portion N to be formed on one surface of the current collector 100, the first inclined portion 210 to be formed at the end of the first active material layer 200, and the first protruding portion 220 to be formed at a position spaced by a predetermined distance from the first inclined portion 210.

Through the above-described process, the first active material layer 200 is formed on the one surface of the current collector 100, and subsequently the second active material layer 300 is formed on the other surface of the current collector 100 by the above-described coating device. The above-described process includes a process of transferring the current collector 100 in one direction; and a process of forming the second active material layer 300 including the second inclined portion 310 and the second protruding portion 320 by applying the second active material, i.e., the second active material slurry, on the other surface of the current collector 100. In particular, the process of transferring the current collector 100 in one direction and the process of forming the second active material layer 300 of the other surface of the current collector 100 may be performed by the above-described coating device.

The method for manufacturing the electrode for a secondary battery in accordance with an exemplary embodiment controls the second protruding portion 320 of the second active material layer 300 to be formed at a position that is not directly opposite to the first inclined portion 210 with respect to the current collector 100 in the process of forming the second active material layer 300.

The above-described position control of the second protruding portion 320 may be performed by regulating an application pressure of the second active material layer 300. In other words, when the second active material layer 300 is formed on the other surface of the current collector 100, the position of the second protruding portion 320 may be controlled by adjusting the application pressure of the coating die that supplies the second active material slurry.

In particular, when the application pressure of the coating die for supplying the second active material slurry increases, as illustrated in FIG. 4, the second protruding portion 320 of the second active material layer 300 may be displaced from the position directly opposite to the first inclined portion 210 to the end side (left side on the drawing) of the current collector 100. When the application pressure of the coating die for supplying the second active material slurry decreases, the second protruding portion 320 of the second active material layer 300 may be displaced from the position directly opposite to the first inclined portion 210 to an opposite side (right side on the drawing) of the end of the current collector 100. Further, the position of the second protruding portion 320 may be adjusted by locally regulating the application pressure of the coating die for supplying the second active material slurry. In other words, when the second active material slurry is supplied, as the application pressure of the coating die is reduced at the position of the first inclined portion 210, the second protruding portion 320 may be controlled to be formed at the position that is not directly opposite to the first inclined portion 210 with respect to the current collector 100.

As described above, the regulation of the application pressure of the coating die may be performed by controlling a valve for supplying the second active material slurry. In particular, the coating die may include an accommodation part for accommodating the second active material slurry, a nozzle for discharging the second active material slurry, and a valve for regulating an internal pressure of the accommodation part. The valve may be a rod that is installed in the accommodation part in an ascending/descending manner to press the second active material slurry accommodated in the accommodation part. The valve may be driven by a motor. Although an electric motor, which is operated by an electric signal, may be used for the above-described motor for driving the valve, a voice coil motor (VCM) is preferred to precisely regulate the internal pressure of the accommodation part. A force of the voice coil motor is unaffected by positions since a coil thereof is operated in a uniform magnetic field and used for a micro-operation of several micrometers or less. Further, the voice coil motor may precisely regulate the application pressure of the coating die for supplying the second active material slurry due to a fast response speed thereof.

Additionally, the position control of the second protruding portion 320 may be performed by regulating the transfer speed of the current collector 100 when the second active material layer 300 is applied. In particular, when the second active material layer 300 is formed on the other surface of the current collector 100, the position of the second protruding portion 320 may be controlled by adjusting a rotation speed of each of the supply roll and the winding roll, which transfer the current collector 100 in one direction, and regulating the transfer speed of the current collector 100.

As illustrated in FIG. 4, when the transfer speed of the current collector 100 decreases in the process of forming the second active material layer 300, the second protruding portion 320 of the second active material layer 300 is displaced from the position directly opposite to the first inclined portion 210 to the end side (left side on the drawing) of the current collector 100. In addition, when the transfer speed of the current collector 100 increases in the process of forming the second active material layer 300, the second protruding portion 320 of the second active material layer 300 is displaced from the position directly opposite to the first inclined portion 210 to the opposite side (right side on the drawing) of the end of the current collector 100. Furthermore, as the transfer speed of the current collector 100 is locally adjusted, the position of the second protruding portion 320 may be adjusted. In other words, when the current collector 100 is transferred, the second protruding portion 320 may be controlled to be formed at the position that is not directly opposite to the first inclined portion 210 with respect to the current collector 100 by increasing the transfer speed of the current collector at the position directly opposite to the first inclined portion 210.

The above-described electrode in accordance with an exemplary embodiment may be used for a jellyroll-type electrode assembly. In particular, as an electrode assembly in which a positive electrode, a negative electrode, and a separator disposed between the positive electrode and the negative electrode, at least one of the positive electrode and negative electrode may be the above-described electrode for a secondary battery.

Figure 7:
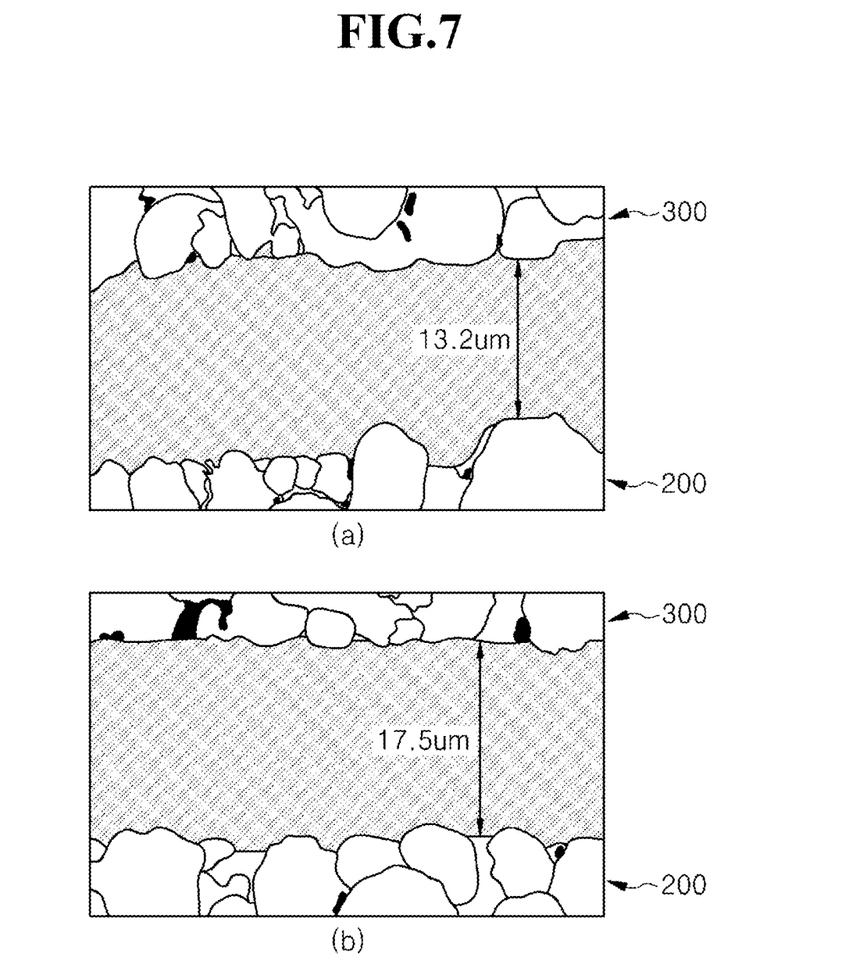
FIG. 7 is a view illustrating a state in which a pressure is applied to the current collector of the electrode for a secondary battery in accordance with an exemplary embodiment.

FIG. 7 is a view illustrating a state in which a pressure is applied to the current collector in the electrode for a secondary battery in accordance with an exemplary embodiment. In particular, (a) of FIG. 7 illustrates a state in which a pressure is applied to the current collector 100 when the protruding portion 320 of the second active material layer 300 is disposed at the position directly opposite to the first inclined portion 210 of the first active material layer 200, and (b) of FIG. 7 illustrates a state in which a pressure is applied to the current collector 100 when the protruding portion 320 of the second active material layer 300 is not disposed at the position directly opposite to the first inclined portion 210 of the first active material layer 200.

The protruding portion 320 of the second active material layer 300 has a width of approximately 8 mm and a height of approximately 8 µm, and the first inclined portion 210 of the first active material layer 200 has a thickness of approximately 20 µm from the current collector 100.

As illustrated in (a) of FIG. 7, when the protruding portion 320 of the second active material layer 300 is disposed at the position directly opposite to the first inclined portion 210 of the first active material layer 200, the current collector 100 between the first active material layer 200 and the second active material layer 300 has a thickness of approximately 13.2 µm. However, in the case of the electrode for a secondary battery in accordance with an exemplary embodiment in (b) of FIG. 7, since the current collector 100 has a thickness of approximately 17.5 µm, a pressure applied to the current collector 100 decreases, and accordingly the local rolling ratio is effectively reduced.

Figure 8:
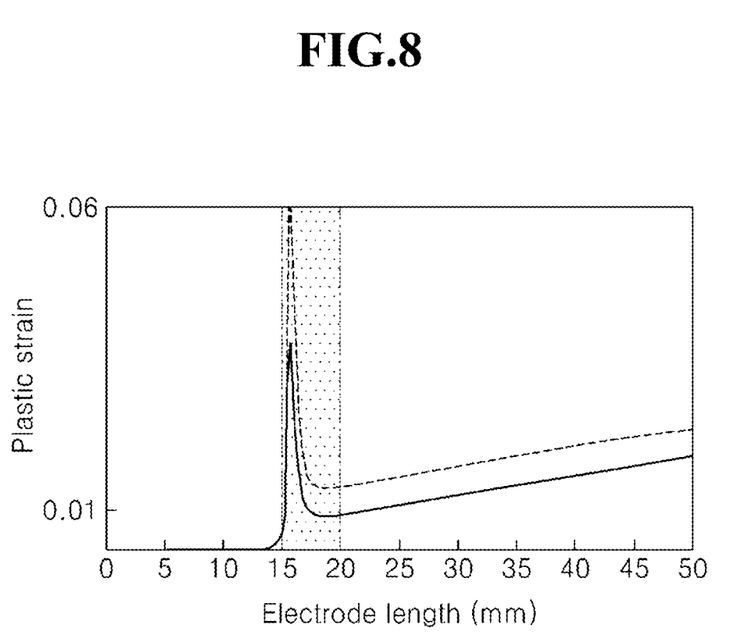
FIG. 8 is a view illustrating a plastic strain of the current collector of the electrode for a secondary battery in accordance with an exemplary embodiment.

The above-described plastic strain of the current collector 100 based on the thickness variation thereof is illustrated in FIG. 8. In FIG. 8, a dotted line represents the equivalent plastic strain (PEEQ) of the current collector 100 when the protruding portion 320 of the second active material layer 300 is disposed at the position directly opposite to the first inclined portion 210 of the first active material layer 200, and a solid line represents the equivalent plastic strain (PEEQ) of the current collector 100 when the protruding portion 320 of the second active material layer 300 is not disposed at the position directly opposite to the first inclined portion 210 of the first active material layer 200.

As illustrated by a dotted line in FIG. 8, when the protruding portion 320 of the second active material layer 300 is disposed at the position directly opposite to the first inclined portion 210 of the first active material layer 200, the peak value of the equivalent plastic strain (PEEQ) of the current collector 100 substantially increases to have a value of approximately 0.06 or more in the length of approximately 10 mm to approximately 20 mm from the end of the current collector 100 due to increase in the local rolling ratio. However, as illustrated as a solid line in FIG. 8 in accordance with an exemplary embodiment, when the protruding portion of the second active material layer 300 is not disposed at the position directly opposite to the first inclined portion 210 of the first active material layer 200, the peak value of the equivalent plastic strain decreases by approximately 50%, i.e., approximately a maximum of 0.03. Accordingly, the deformation of the current collector 100 may be prevented. In other words, when the protruding portion 320 of the second active material layer 300 is disposed at the position directly opposite to the first inclined portion 210 of the first active material layer 200, out of 6,763K (K=1,000) electrodes for a secondary battery manufactured by electrode winding, a crack occurred in 104K electrodes for a secondary battery, which corresponds to a failure rate of approximately 1.54%. However, in accordance with an exemplary embodiment, when the second active material layer 300 is not disposed at the position directly opposite to the first inclined portion 210 of the first active material layer 200, no crack occurred in any of the manufactured 5,910K (K=1,000) electrodes for a secondary battery, and thus the electrodes for a secondary battery may be manufactured with 0% failure rate, and thus a crack occurring while the electrode is manufactured may be prevented in advance.

As described above, according to the secondary battery electrode, the manufacturing method for the same, and the electrode assembly in accordance with an exemplary embodiment, as the protruding portion of the second active material layer 300 is controlled to be formed at the position that is not directly opposite to the inclined portion of the first active material layer 200 with respect to the current collector 100, the pressure applied to the current collector 100 is relieved to prevent the current collector 100 from being deformed, and the crack that may occur while the electrode is manufactured may be prevented in advance.

Furthermore, in accordance with an exemplary embodiment, as the shape of each of the first active material layer 200 and the second active material layer 300, which are formed on the both surfaces of the current collector 100, respectively, is controlled to prevent the thickness of the electrode from rapidly increasing, the electrode for a secondary battery having a uniform thickness may be achieved, and product safety, an economical efficiency, and a yield may be enhanced.

Although the exemplary embodiments of the present invention have been described, it is understood that the present invention should not be limited to these exemplary embodiments but various changes and modifications may be made by one of ordinary skill in the art within the spirit and scope of the present invention as hereinafter claimed. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A secondary battery electrode of a jelly-roll electrode assembly, comprising:
   a current collector that extends in one direction;
   a first active material layer provided on one surface of the current collector and comprising a first inclined portion and a first protruding portion sequentially arranged from an end of the current collector,
      wherein the first inclined portion and the first protruding portion are separate apart with a first flat portion, and
      the first inclined portion is closer to the end of the current collector than the first protruding portion; and
   a second active material layer provided on the other surface of the current collector and comprising a second inclined portion and a second protruding portion sequentially arranged from the end of the current collector,
      wherein the second inclined portion and the second protruding portion are separate apart with a second flat portion, and
      the second inclined portion is closer to the end of the current collector than the second protruding portion;
   wherein a position of the second protruding portion is controlled on the second active material layer to be disposed at a position that is not directly opposite to the first inclined portion with respect to the current collector the second inclined portion, the second protruding portion, the first inclined portion, and the first protruding portion are sequentially arranged from an end of the current collector, and are not in overlap with each other in a thickness direction of the current collector, or the second inclined portion, the first inclined portion, the second protruding portion, and the first protruding portion are sequentially arranged from the end of the current collector, and are not in overlap with each other in the thickness direction of the current collector.

2. The electrode of claim 1, wherein the second protruding portion is spaced by a predetermined distance from the second inclined portion.

3. The electrode of claim 1, wherein a non-coated portion, on which no first active material layer is applied, is provided on one surface of the current collector.

4. The electrode of claim 3, wherein the non-coated portion has a length of 10 mm to 20 mm in an extension direction of the current collector.

5. The electrode of claim 1, wherein the first inclined portion and the first protruding portion are provided on one side of the first active material layer, and
   wherein the second inclined portion and the second protruding portion are provided on one side of the second active material layer, which is disposed in the same direction as the one side of the first active material layer.

6. The electrode of claim 1, wherein each of the first active material layer and the second active material layer is made of an electrode active material for a negative electrode or an electrode active material for a positive electrode.

7. An electrode assembly, which is manufactured by winding a positive electrode, a negative electrode, and a separator disposed therebetween, comprising at least one of the positive electrode and the negative electrode comprising the electrodes of claim 1.

8. A manufacturing method for a secondary battery electrode of a jelly-roll electrode assembly, comprising:
   a process of preparing a current collector on which a first active material layer comprising a first inclined portion and a first protruding portion is formed on one surface thereof
      wherein the first inclined portion and the first protruding portion are separate apart with a flat portion, and
      the first inclined portion is closer to the end of the current collector than the first protruding portion;
   a process of transferring the current collector in one direction; and
   a process of forming a second active material layer comprising a second inclined portion and a second protruding portion by applying a second active material on the other surface of the current collector
      wherein the second inclined portion and the second protruding portion are separate apart with a flat portion, and
      the second inclined portion is closer to the end of the current collector than the second protruding portion,
   wherein in the process of forming the second active material layer, a position of the second protruding portion is controlled on the second active material layer to be formed at a position that is not directly opposite to the first incline portion with respect to the current collector, the second inclined portion, the second protruding portion, the first inclined portion, and the first protruding portion are sequentially arranged from an end of the current collector, and are not in overlap with each other in a thickness direction of the current collector, or the second inclined portion, the first inclined portion, the second protruding portion, and the first protruding portion are sequentially arranged from the end of the current collector, and are not in overlap with each other in the thickness direction of the current collector.

9. The method of claim 8, wherein in the process of forming the second active material layer, the second protruding portion is spaced by a predetermined distance from the second inclined portion.

10. The method of claim 8, wherein a non-coated portion, on which no first active material layer is applied, is formed on one surface of the current collector.

11. The electrode of claim 10, wherein the non-coated portion has a length of 10 mm to 20 mm in an extension direction of the current collector.

12. The method of claim 8, wherein the position of the second protruding portion is controlled by regulating an application pressure of the second active material layer.

13. The method of claim 8, wherein the position of the second protruding portion is controlled by regulating a transfer speed of the current collector.

* * * * *